(12) United States Patent
Lund

(10) Patent No.: US 8,134,458 B2
(45) Date of Patent: Mar. 13, 2012

(54) COMMUNICATION APPARATUS AND METHOD

(75) Inventor: David Lund, Lancaster (GB)

(73) Assignee: Acbond Limited, Leyland (GB)

(*) Notice: Subject to any disclaimer, the term of this patent is extended or adjusted under 35 U.S.C. 154(b) by 485 days.

(21) Appl. No.: 12/302,688

(22) PCT Filed: May 25, 2007

(86) PCT No.: PCT/GB2007/001954
§ 371 (c)(1),
(2), (4) Date: Nov. 26, 2008

(87) PCT Pub. No.: WO2007/138283
PCT Pub. Date: Dec. 6, 2007

(65) Prior Publication Data
US 2009/0284356 A1    Nov. 19, 2009

(30) Foreign Application Priority Data

May 26, 2006 (GB) .................................. 0610503.5

(51) Int. Cl.
*G08B 1/08* (2006.01)
(52) U.S. Cl. .................. 340/538; 340/538.15; 340/531
(58) Field of Classification Search .................. 340/538, 340/538.15, 538.17, 531; 379/37, 43; 702/188; 370/215, 236
See application file for complete search history.

(56) References Cited

U.S. PATENT DOCUMENTS

| | | | |
|---|---|---|---|
| 4,510,611 A * | 4/1985 | Dougherty | 375/222 |
| 4,521,645 A | 6/1985 | Caroll | |
| 4,815,106 A * | 3/1989 | Propp et al. | 375/257 |
| 4,864,589 A | 9/1989 | Endo | |
| 4,866,757 A | 9/1989 | Nilssen | |
| 5,136,281 A | 8/1992 | Bonaquist | |
| 5,486,805 A | 1/1996 | Mak | |
| 5,493,272 A | 2/1996 | Beghelli | |
| 6,278,357 B1 * | 8/2001 | Croushore et al. | 375/259 |
| 6,784,790 B1 * | 8/2004 | Lester | 375/239 |
| 7,265,654 B1 * | 9/2007 | Lester | 340/12.33 |
| 7,378,952 B2 * | 5/2008 | Pumpelly et al. | 340/538 |
| 7,466,225 B2 * | 12/2008 | White et al. | 340/538 |
| 7,795,877 B2 * | 9/2010 | Radtke et al. | 324/530 |
| 2002/0024424 A1 | 2/2002 | Burns et al. | |

OTHER PUBLICATIONS

UK Search Report Under Section 17 for GB0610503.5, Sep. 25, 2006, 1 page.
PCT International Search Report for PCT/GB2007/001954, Oct. 23, 2007, 4 pages.
PCT Written Opinion for PCT/GB2007/001954, Oct. 23, 2007, 6 pages.
Chunduru V.; Subramanian N.; "Effects of Power Lines on Performance of Home Control System", XP-002451972; Dec. 12, 2006; 6 pages, New Delhi, India.

* cited by examiner

*Primary Examiner* — Toan N Pham
(74) *Attorney, Agent, or Firm* — Reising Ethington P.C.

(57) ABSTRACT

A communication apparatus (1) for communicating over an electrical power cable (3). The communication apparatus (1) comprises a transmitter circuit (5) adapted to transmit a communication signal; and a receiver circuit (6) adapted to receive a communication signal from another communication apparatus (1). The communication apparatus (1) is adapted to transmit and receive communication signals over the power cable (3) both when said power cable (3) is conducting electricity and when said power cable (3) is not conducting electricity.

23 Claims, 2 Drawing Sheets

COMMUNICATION APPARATUS AND METHOD

Figure 1:
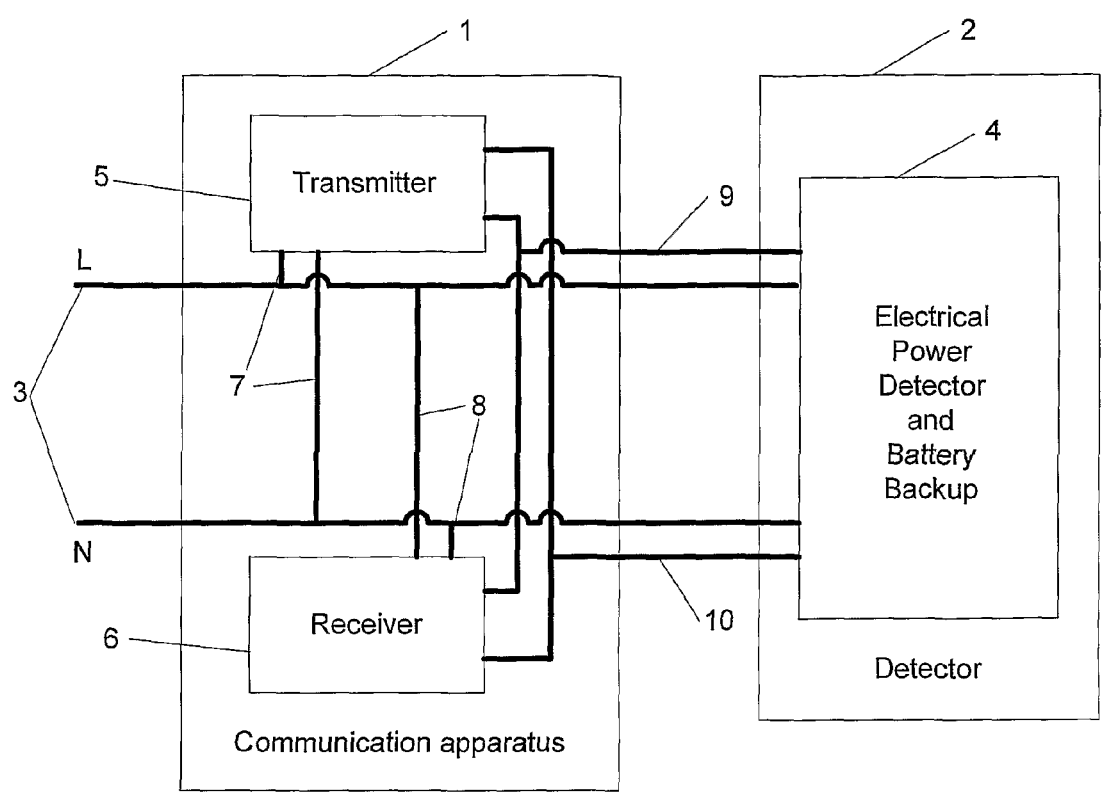

The present invention relates to an apparatus and method for communicating over power cables. In particular, but not exclusively, the present invention relates to a method and apparatus for allowing detectors to communicate over existing, or newly installed power cables within buildings, such that if one detector is triggered a signal is transmitted alerting other detectors. The term "detector" includes, but is not limited to, smoke and/or heat detector, carbon monoxide detectors and security detectors, such as motion detectors.

As an example of the prior art, within domestic and commercial buildings, smoke and heat detectors are commonly provided in order to detect a fire or the risk of a fire and alert people within the building. Typically, once smoke or excessive heat is detected at a first detector that detector triggers an alarm. Alternatively, the first detector may trigger some other device, such as turning on lights, or remote signalling, for example alerting the fire brigade.

Commonly, there is more than one detector per building. For instance, in a large building there may be one detector in each room, or one detector per group of rooms. It will readily be appreciated that in such a scenario it may be that only the detector closest to the fire will detect a fire and trigger an alarm. People some distance from the detector that detects the fire may not hear the alarm.

There is a recognised requirement for communication between smoke/heat detectors, such that once a first detector detects a fire other detectors are alerted allowing their alarms to be set off, warning people in other parts of the building. This allows the warning of the fire to be spread more generally throughout the building. This may be particularly needed in a multi-occupancy building such as a block of flats.

At present, the usual method of providing this communication between smoke/heat detectors is to provide dedicated wires between pairs of detectors. Alternatively, radio frequency transmitters/receivers may be used to connect a network of detectors. However, such communication can be expensive to install and maintain.

Smoke/heat detectors are often connected to a mains electricity supply via power cables within a building, allowing them to operate in standby mode for extended periods of time. Usually, a battery is connected to each detector to act as a backup in the event of the mains electricity supply being interrupted (either when the detectors are in a standby mode, or during a fire). The battery is typically recharged from the mains electricity supply via the power cable.

Communications protocols that operate over mains electricity supplies are known. This avoids the necessity of providing additional wiring, or radio frequency communications links, between devices that are already connected to a mains electricity supply. However, such communications protocols are typically synchronised to the mains electricity supply, and are therefore not suitable for communications between detectors. This is because the mains electricity supply can fail during a power cut and is often interrupted during fires, thus preventing detectors from communicating with each other.

It is an object of the present invention to obviate or mitigate one or more of the problems associated with the prior art, whether identified herein or elsewhere.

According to a first aspect of the present invention there is provided a communication apparatus for communicating over an electrical power cable, comprising: a transmitter circuit adapted to transmit a communication signal; and a receiver circuit adapted to receive a communication signal from another communication apparatus; wherein the communication apparatus is adapted to transmit and receive communication signals over the power cable both when said power cable is conducting electricity and when said power cable is not conducting electricity.

By allowing communications over power cables, even when the mains electricity supply is interrupted, reliable communications between connected devices can be provided. This is particularly desirable for communications between safety critical devices such as smoke/heat detectors.

The electrical power cable may be adapted to conduct mains electricity.

Preferably, the communication apparatus is adapted to be connectable to a device, the transmitter circuit being adapted to transmit the communication signal in response to an input control signal received from the device, and the receiver circuit being adapted to generate an output control signal indicative of whether a communication signal has been received and transmit the output control signal to the device. Said device may be a heat or smoke detector.

The communication apparatus may be adapted to be supplied with electrical power by a battery contained within said device or said communication apparatus.

Preferably, the communication signal comprises an amplitude shift keying signal. Preferably, the amplitude shift keying signal comprises the presence or absence of a carrier signal at 108 kHz.

Preferably, the communication signal comprises a Gold codeword. Preferably, the transmitter circuit is adapted to cyclically transmit the Gold codeword. Preferably, the transmitter circuit is adapted to wait for a predetermined guard time period before each transmission of the Gold codeword.

The communication apparatus may be adapted to transmit and receive only one assigned Gold codeword. Alternatively, the communication apparatus may be adapted to transmit and receive more than one assigned Gold codewords.

Preferably, the receiver circuit further comprises: an analog to digital converter adapted to sample the communication signal and output digital samples; and a filter adapted to filter the digital samples.

Preferably, the receiver circuit further comprises: an amplitude tracker adapted to calculate the magnitude of each of a group of digital samples from the filter; a mark counter adapted to count the number of digital samples within the group having magnitudes equal to or greater than a predetermined threshold; a space counter adapted to count the number of digital samples within the group having magnitudes less than the predetermined threshold; a comparator adapted to output an output signal indicative of whether or not the mark counter exceeds the space counter; and a buffer adapted to store the output of the comparator.

Preferably, the buffer is adapted to store the output of the comparator for each of a predetermined number of groups of digital samples.

Preferably, the receiver circuit is further adapted to calculate the logical exclusive OR of the contents of the buffer and the or each assigned Gold code, and to generate an output control signal indicative of the result of said correlation.

According to a second aspect of the present invention there is provided a method of communicating over an electrical power cable, the method comprising: transmitting a communication signal; and receiving a communication signal; wherein said transmitting and receiving communication signals over said power cable takes place both when said power cable is conducting electricity and when said power cable is not conducting electricity.

Preferably, transmitting a communication signal comprises: transmitting the communication system in response to an input control signal; and wherein the method further comprises: generating an output control signal indicative of whether a communication signal has been received.

Preferably, transmitting a communication signal further comprises transmitting an amplitude shift keying signal.

Preferably, transmitting a communication signal further comprises transmitting a Gold codeword.

Preferably, transmitting a communication signal further comprises transmitting the Gold codeword cyclically.

Preferably, transmitting a communication signal further comprises waiting for a predetermined guard time period before each transmission of the Gold codeword.

Preferably, receiving a communication signal comprises: sampling the communication signal to generate digital samples; and filtering the digital samples.

Preferably, receiving a communication signal further comprises: grouping a predetermined number of consecutive digital samples; calculating the magnitude of each digital sample in the group; comparing the magnitude of each digital sample in the group to a predetermined threshold; incrementing either a mark counter or a space counter if the outcome of the said comparison is above or below the predetermined threshold respectively; comparing the mark counter and the space counter at the end of the group; and buffering the result of said comparison.

Preferably, receiving a communication signal further comprises: buffering the result of said comparison for each of a predetermined number of groups of digital samples.

Preferably, receiving a communication signal further comprises: computing the logical exclusive OR of the buffered results of said comparison for each of the predetermined number of groups of digital samples and at least one assigned Gold code; and generating an output control signal indicative of the result of said computed logical exclusive OR.

According to a third aspect of the present invention there is provided a fire detection system comprising: a communication apparatus for communicating over an electrical power cable, the communication apparatus comprising: a transmitter circuit adapted to transmit a communication signal; and a receiver circuit adapted to receive a communication signal from another communication apparatus; and a fire detector adapted to receive output control signals from the communication apparatus and transmit an input control signal to the communication apparatus upon detecting a fire; wherein the transmitter circuit is adapted to transmit the communication signal in response to the input control signal, and the receiver circuit is adapted to generate the output control signal to indicate whether a communication signal has been received, the communication apparatus being adapted to transmit and receive communication signals over said power cable both when said power cable is conducting electricity and when said power cable is not conducting electricity.

Figure 2:
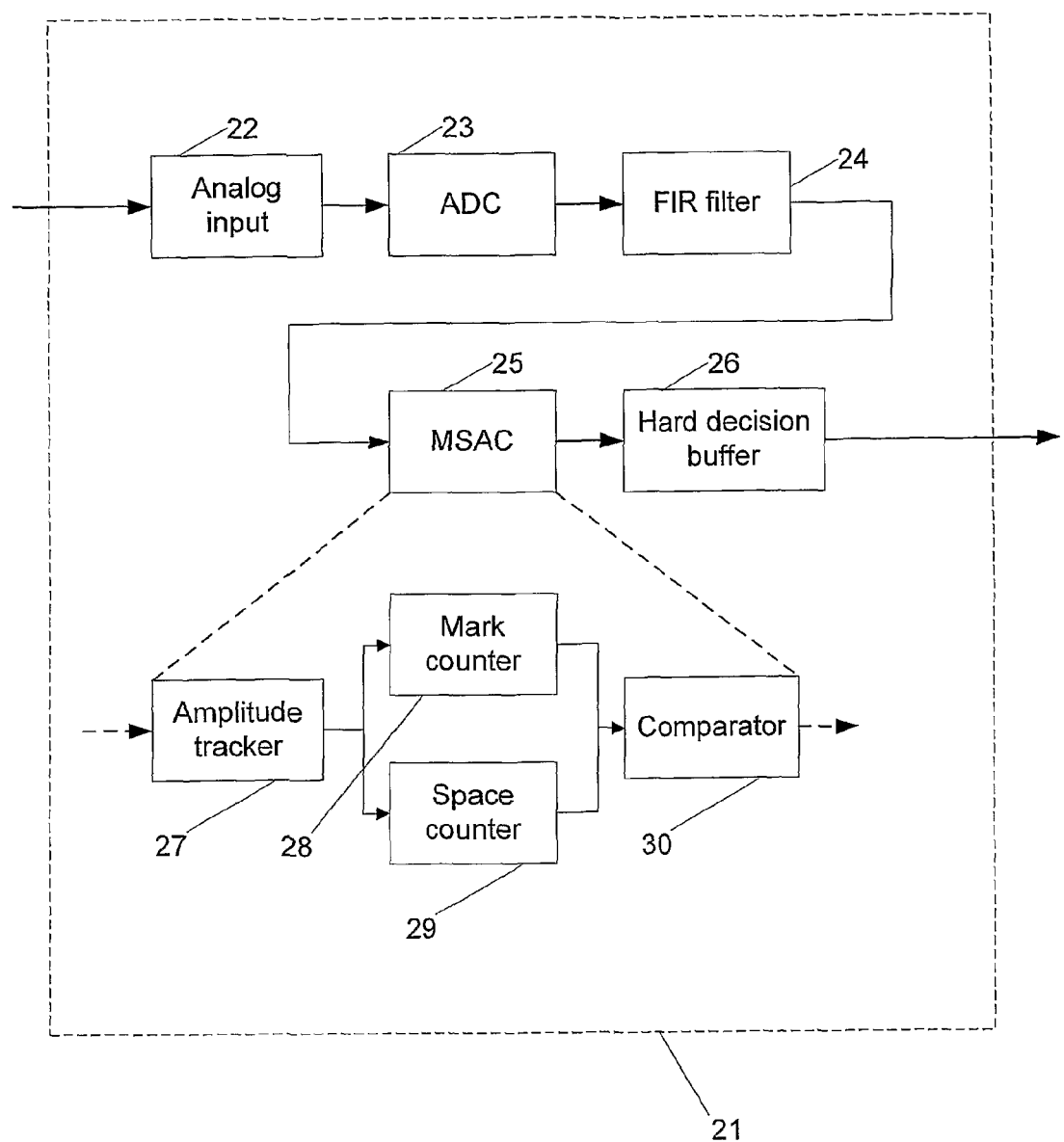

Embodiments of the present invention will now be described, by way of example only, with reference to the accompanying drawings, in which:

FIG. 1 schematically illustrates a communication apparatus for communicating over power cables in accordance with an embodiment of the present invention, associated with a detector; and FIG. 2 schematically illustrates a signal detection algorithm for receiving communications signals in accordance with an embodiment of the present invention.

Embodiments of the present invention are described herein with specific mention of their use in connection with smoke and/or heat detectors. The present invention is not limited to this, and is suitable for connecting any type of detector, or indeed any other device, over power cables.

It is known to send communications signals over power cables. X10 is an industry standard protocol for communication between connected devices over power cables within domestic properties. X10 uses mains electricity power cables for signalling and control purposes. X10 signals comprise short radio frequency bursts representing digital information. These bursts are synchronised to, and transmitted during, the relatively quiet periods around the zero-crossing points of a domestic 50 or 60 Hz AC electricity supply.

However, the fact that X10 is synchronised to the zero-crossing points of the AC waveform means that if the mains power supply is interrupted the X10 protocol breaks down due to the transmitting and receiving units losing synchronisation. Furthermore, X10 operates at a relatively high power. Without the mains electricity supply, X10 communication would rapidly drain the power from any battery backup provided for a detector. X10 is also widely considered to be unreliable due to its susceptibility to blocking and interference caused by other electrical equipment. For these reasons, X10 is unsuited for use in communications between detectors.

A communication system in accordance with an embodiment of the present invention allows smoke/heat detectors to communicate over existing mains electricity power cables within a building. In accordance with alternative embodiments of the present invention, the communication system can also work over other power cables that carry a DC or AC voltage power supply. The power cable supplies electrical power to the smoke/heat detector.

The term "power cable", as used herein is to be interpreted as an electrical conductor, capable of supplying sufficient electrical power to act as a source of electrical power to connected devices. Thus, a cable carrying only a conventional communications signal would not fall within the definition of power cable for the present purposes.

Each detector may also have a battery to provide electrical power in the event that the mains electricity supply is interrupted. If the detector has such a back-up batter, then typically the electrical power supplied by the power cable is arranged to recharge the battery.

When a first detector has detected a fire or a risk of a fire, a communication apparatus associated with the detector begins to transmit a communication signal over the power cable connected to that detector. The communication signal is transmitted either for a predetermined period or until the detector indicates that it no longer detects smoke or excess heat.

Each communication apparatus associated with a smoke/heat detector is arranged to continuously listen for signals from other communication apparatuses indicating that a fire or a risk of a fire has been detected (for instance in another part of the building). As long as the transmitting and receiving communication apparatuses remain connected via power cables (whether or not the power cables continue to carry electrical power) transmitted signals will be detected. If appropriate, a communication apparatus receiving such a signal can also trigger the alarm of an associated detector, or take any other predetermined action.

Referring now to FIG. 1, this schematically illustrates a communication apparatus 1 in accordance with the present invention. The communication apparatus 1 is associated with a detector 2, for instance, a smoke/heat detector 2. Smoke/heat detector 2 may be entirely conventional, and as such will not be described in further detail.

In a preferred embodiment of the present invention, the communication apparatus 1 comprises a modular component, arranged to slide into a standard push fit connection in a smoke/heat detector 2, such that the communication apparatus 1 fits between the smoke/heat detector 2 and a ceiling mounting.

The component parts of the communication apparatus 1 are typically integrated into a single programmed microprocessor. However, the present invention is not limited to any particular physical implementation. The component parts of the communication apparatus are mounted on a printed circuit board. Connected to the printed circuit board are metal pins, which protrude through a plastic housing. Upon connection to the smoke/heat detector 2, the metal pins electrically couple the communication apparatus 1 to the detector 2, such that electrical power and communications signals can be transferred.

The communication apparatus 1 is arranged such that it interfaces with standard terminals provided on detector 2 for providing electrical power to the detector from a mains electricity power cable and for passing communications signals indicating that the detector has detected a fire, or that another detector has detected a fire. The detector 2 may be such that it can connect to an existing form of communication apparatus, which communicates with other detectors over dedicated communication links. Such an existing detector need not be modified, and operates in the same way as before, when associated with a communication apparatus 1 in accordance with an embodiment of the present invention.

FIG. 1 further illustrates the mains electricity power cable 3 supplying power to the detector 2, depicted as a live wire L and a neutral wire N. An earth wire (not illustrated) may also be provided. The power cable 3 extends through the communication apparatus 1 and connects to the detector 2. The detector 2 comprises a rechargeable battery 4 (and also an electrical power detector, arranged to detect whether power cable 3 is supplying electrical power). Battery 4 is charged from the mains electricity supply when this is connected via power cable 3, in a conventional manner. Battery 4 in turn powers the operation of the detector 2.

Communication apparatus 1 comprises a transmitter circuit 5 and a receiver circuit 6. Alternatively, the transmit and receive functions of the present invention can be integrated into a single transceiver circuit. Transmitter circuit 5 and receiver circuit 6 are arranged to transmit and receive communication signals to and from the power cable 3 respectively. As such, both the transmitter circuit 5 and the receiver circuit 6 are connected to the power cable 3 by connectors 7 and 8 respectively. Connectors 7 and 8 may comprise wires.

Power is supplied to the transmitter circuit 5 and the receiver circuit 6 from battery 4 via a DC power cable 9. As an alternative, power for the communication apparatus 1 may be supplied directly from the power supply cable 3 when the mains electricity supply is connected. As a further alternative, the communication apparatus 1 may further comprise another battery to supply the communication apparatus with power. This further battery may be in place of, or in addition to, the battery within the detector.

Transmitter circuit 5 and receiver circuit 6 are connected to the detector 2 by a control connector 10. Control connector 10 may comprise a control wire. When detector 2 detects a fire, a control signal is passed to the transmitter circuit 5 via control wire 10, activating transmitter circuit 5 to transmit the communications signal to other communication apparatuses 1 connected to power cable 3. As will be described in greater detail below, the transmitter 5 is arranged to cyclically transmit the control signal, with gaps (or guard intervals) between each transmission. Conversely, receiver circuit 6 is arranged to listen for communications signals transmitted by other communication apparatuses 1 on power cable 3. When receiver circuit 6 receives such a communications signal, it sends a control signal to the detector 2 via control wire 10 such that the detector 2 can take a predetermined action, such as to trigger an alarm.

The transmitter 5 is triggered by a non-zero DC signal supplied via control wire 10, originating from the detector 2. This activates the transmitter to send the communication signal. This state of operation is called a "local alarm". The transmitter remains in the local alarm state until the DC signal on control wire 10 is removed by the detector 2. When the receiver 6 receives a communication signal from another communication apparatus, it sets a non-zero DC voltage control signal on control wire 10. When the control signal is detected on control wire 10 by the smoke/heat detector, an alarm sound is activated by the detector, in a conventional manner. This state of operation is referred to as a "remote alarm" state.

In certain embodiments of the invention, the communication signal transmitted by each communication apparatus on power cable 3 is arranged to be detectable by other communication apparatuses within at least 100 m of power cable of the transmitting communication apparatus by providing sufficient signal transmission power to the transmitters together with robust specialised signal processing, (described below). The system may include any number of communication apparatuses, arranged to receive the communication signal.

The communication signal transmitted by a communication apparatus indicating that smoke or excess heat has been detected comprises a periodically repeated Gold code. A Gold code is a class of error correcting codes in information theory, which is a binary sequence chosen for its good correlation properties for a cyclic transmission. A Gold code comprises a set of Gold codewords. A Gold codeword within a set of n Gold codewords, if correlated with every Gold codeword in the set, has a high correlation only with itself, and minimal correlation with the remaining n−1 codewords. This property of Gold codes still hold true even if any bits in a given codeword are inverted due to the effects of noise in communication channels. This key property of Gold codes enables unique identification of each communication signal, such that a detector will only trigger another if its unique identification perfectly matches the codeword even in noisy communication channel conditions. In an embodiment of the present invention the length of each Gold codeword is 31 bits.

Each communication apparatus has an adjustable 4-bit address. This address can be set for each communication apparatus 1. For instance, each communication apparatus 1 can further comprise 4 manually set dipswitches on the communication apparatus 1. The positions of the dipswitches are interpreted by a communication protocol to correspond to a particular stored address. In an embodiment of the present invention, each address corresponds to one of 16 different 31 bit long Gold codewords. The choice of Gold codeword length is a compromise between system complexity and detection accuracy in noisy channel conditions. It is possible to use Gold codewords that are longer or shorter than 31 bits in variants of this communication apparatus. If more than 16 addresses are needed, then further dipswitches may be provided.

Each communication apparatus is arranged to only respond to a received communication signal if it is the same Gold codeword as that set within the communication apparatus. In this way zones of smoke detectors can be created such that if one detector detects a fire only certain other detectors programmed with the same Gold code will sound the alarm. This may have particular utility in domestic properties as, otherwise, smoke detectors in neighbouring properties could be triggered by a detected fire in a first property (due to the neighbouring properties being within the minimum transmission range along the power cable of 100 m). As discussed above, each detector could be arranged to detect two or more Gold codewords, for instance to respond to fires in its own zone and immediately adjacent zones. A communication apparatus can either be in a transmission or a reception mode. In the case that two communication apparatuses transmit at exactly the same time, this will cause interference within the 100 m range of each communication apparatus. However this is unlikely, as each transmitter does not continuously transmit Gold codewords without interruptions. Between consecutive transmissions of codewords there is sufficient guard time period, greater than the length of a Gold codeword, in terms of time. This guard time period has been found to give a sufficient safety level to avoid collision in case two apparatuses are both transmitting.

If the transmitted Gold codeword is interrupted then communication apparatuses previously receiving the communication signal will stop carrying out the action associated with the signal (e.g. in the case of a smoke/heat detector the alarm will stop). However, the system is resilient in the face of noise and short interruptions of the signal.

The Gold code sequence is transmitted between the communication apparatuses using amplitude shift keying (ASK). In this modulation scheme, either a carrier frequency is present or absent. The presence of the carrier frequency, for a single time period, corresponds to a transmitted '1' and its absence corresponds to a '0'. Thus, in each time period, the modulation scheme transmits a single bit of information. In a preferred embodiment of the present invention the carrier frequency used is 108 kHz. This frequency is chosen as it falls within an unregulated frequency band, available for public unlicensed use. In alternative embodiments of the present invention, it is possible to use other carrier frequencies, for instance frequencies that fall within an unlicensed frequency band between 95 kHz and 125 kHz.

Each receiving communication apparatus is arranged to synchronise itself to a received communication signal, based upon a known duration of each bit. The receiver 6 initially expects to receive a preamble of alternating '1's and '0's before every Gold codeword. The length of this alternating binary sequence is known to the receiver. Therefore, until the receiver detects the full preamble, it ignores the associated Gold codeword. If the receiver fails to detect the full preamble on its first attempt, it has another opportunity after the first Gold codeword to receive the full preamble, when the codeword is next transmitted by the transmitter. The length and the duration of the preamble can vary depending on the particular embodiment of the communication apparatus. Once a full preamble is detected by the receiver, an absolute time reference is assigned to the beginning of the Gold codeword. Once the receiver establishes this time reference, it can then uniquely identify which bit of the Gold codeword it receives.

As described above, detectors are typically already provided with batteries recharged from the mains electricity supply. As such, the communication apparatus can be powered by the battery in the event of the mains electricity supply being interrupted.

There are three main types of noise that can affect signal detection for communications between power cable communication apparatuses in accordance with an embodiment of the present invention: amplitude noise, frequency noise and phase noise.

Amplitude noise in the system originates, for instance, from the following sources: additive noise of the mains power cables (e.g. from dimmer switches and mains powered equipment), impedance variations on the power cables and noise generated within the communication apparatus, e.g. within the microprocessor.

Frequency noise is due to variation in the timing circuit inside the microprocessor for the transmitter and receiver and ambient temperature variations, Phase noise is a consequence of inductors in the system causing electrical noise if any electromagnetic interference is present.

The impact of noise on the communication signals transmitted on the power cables is minimised due to the design of the signal detection algorithm, which will now be described with reference to FIG. 2. The signal detection algorithm 21 (referred to herein as MSAC—Mark Space Amplitude Comparison) consists of four key components. FIG. 2 depicts the process of signal detection and recovery within the receiver circuit.

After appropriate input filtering to reduce amplitude, frequency and phase noise (not shown) the analog input carrier waveform 22 passes through an 8-bit analog to digital converter 23. The output of the ADC 23 is passed to a digital Finite Impulse Response (FIR) band pass filter stage 24, which has a narrower pass board than external analogue bandpass filters. The output of the FIR filter is processed by a MSAC block 25 as shown in FIG. 2.

The operation of the MSAC block 25 is shown in greater detail by blocks 27, 28, 29 and 30. Amplitude tracker 27 calculates the magnitude of each of a group of incoming sample from the ADC 23. The size of the sample group can be varied depending on the particular implementation. In a preferred embodiment of the present invention, the group is large enough to last half a bit period. As such, the size of the group is dependent upon the ADC 23 sampling frequency and the bit frequency of the communication signal.

The magnitudes of each sample in the group of ADC samples are passed simultaneously to mark counter 28 and space counter 29 blocks to be compared to a predetermined threshold. If a sample magnitude is greater than the threshold, the mark counter 28 is incremented by one; else the space counter 29 is incremented by one. The predetermined threshold can be calibrated according to the amplitude noise present on the mains electricity supply for a specific implementation of a communication system in accordance with an embodiment of the present invention. This is necessary as the counter values will vary according to the amplitude of the incoming analogue input waveform 22.

At the end of each sample group, the mark counter 28 and the space counter 29 counter values are passed to a comparator 30. The output of the comparator 30 is a '1' if the mark counter 28 content is greater than the Space counter 29 content. Otherwise, it is a '0'. The binary output of the comparator 30 is stored in the hard decision buffer 26, which stores the sequence of bits of a Gold codeword. The size of this buffer depends on the Gold codeword length that is used and is chosen as 31 bits in a preferred embodiment of this invention.

As discussed above, each codeword is preceded by a fixed length preamble of alternating '1's and '0's. In embodiments of the present invention this preamble is not stored in the hard decision buffer. Once the hard decision buffer has received the full codeword (that is once the buffer contains the correct number of bits—31 bits in certain embodiments of the present invention) the receiver 6 correlates the content of the hard decision buffer 26 with the Gold codeword assigned to that communication apparatus. The correlation is performed by computing the logical exclusive OR (XOR) of the locally stored Gold codeword and the content of buffer 26. If the result of the XOR operation is '0', then the correct Gold codeword has been received. Otherwise, a different codeword has been received.

In alternative embodiments of the invention, the correlation of the content of the hard decision buffer 26 with the Gold codeword assigned to that communication apparatus is adapted to determine whether the Gold codeword has been received, even if a proportion of the received codeword is corrupted. Due to the intrinsic properties of Gold codes, embodiments of the present invention are able to correctly identify if a Gold codeword has been received even if up to 30% of the 31 bits have been reversed. This is because the 16 chosen Gold codewords are chosen to be as mutual different as possible.

Each transmitted Gold codeword is preceded by a synchronisation preamble that consists of alternating '1's and '0's of a constant length. The preamble always starts with a 1. The length of this preamble can vary depending on the particular class of Gold codewords used. In a preferred embodiment of this invention, the preamble length is chosen as 10 bits. This is arranged to be greater than the maximum number of alternating '1's and '0's in any of the 16 Gold codewords chosen in the described embodiment of the invention. The receiver attempts to detect all 10 bits of the preamble first in order to establish a reliable time reference for the Gold codeword. If the receiver cannot synchronise to the full preamble on its first attempt, it keeps on retrying and is able to synchronise on consecutive attempts (during later transmission of the communication signal). Detection of the preamble works in the same way as the detection of a Gold codeword (as described above). Once the preamble is detected, the absolute timing reference is acquired for calculating a symbol period for the detection of the successive Gold codeword.

Due to variations in the attenuation levels along the power cables between smoke/heat detectors, the received peak-to-peak voltage at the analog waveform input for the microprocessor may not vary fully between 0V and $V_{DD}$ (the maximum possible input voltage of the ADC 23). This directly affects the dynamic range of the sampled values at the output of the ADC 23. This variation in the dynamic range has an impact on the threshold used in mark counter 28 and the Space counter 29. This is because the optimum decision threshold may move up and down changing the confidence in making accurate bit decisions. The threshold can therefore be fine tuned experimentally for installed communication apparatuses and left unchanged once the optimum threshold has been found.

Advantageously, the signals transmitted by the communication apparatuses are arranged to jump between different power cable circuits within a building. For instance, the signals may jump between a lighting mains circuit and a power outlet circuit. Such transfer of the signal occurs at a transformer serving the building. Alternatively, a capacitive bridge between different power circuits may be provided to ensure optimum coupling, and hence optimal transmission of the communications signal.

In order to prevent the communications signals leaving a local area (for instance leaving the building in which the smoke/heat detectors are installed) a filter, for instance an inductive filter, may be provided.

Although the present invention has been described above with reference to communication between heat/smoke detectors, it will be readily apparent to the appropriately skilled person that the present invention may be equally applicable for communication between other devices connected to a mains electricity supply.

Furthermore, although the above-described preferred embodiment of the invention comprises a system in which only a single item of information can be conveyed (i.e. whether or not a smoke/heat detector has been triggered), the invention is not limited to this. Specifically, in the above-described embodiment, each communication apparatus is arranged to detect whether a single Gold codeword assigned to that communication apparatus is received from the power cable. However, in an alternative embodiment of the present invention, each communication apparatus could be arranged to detect two or more Gold codewords of the present invention, with the receipt of each Gold codeword triggering different actions.

Alternatively, communication apparatuses in accordance with embodiments of the present invention could be arranged to transmit and receive a series of concatenated Gold codes. The concatenated Gold codes could be transmitted once, or cyclically. A particular series of Gold codewords may indicate a particular operation for the device associated with that communication apparatus.

In the above described preferred embodiment, there are 16 different Gold codewords, each 31-bits long. Each communication apparatus is arranged to transmit or receive a single Gold codeword set for that communication apparatus by manually setting four dipswitches. However, the present invention is not limited to this. For instance, the Gold codewords may vary in length, and/or there may be a different chosen number of Gold codewords. For instance, it may be necessary to increase the length of the Gold codewords if more Gold codewords are used, in order to maintain the required level of difference between each Gold code (required for robust detection of particular Gold codewords in a noisy environment). Multiple communication apparatuses may be arranged to detect and receive the same Gold codewords. Each communication apparatus may be arranged to transmit only a single codeword, but arranged to receive multiple codewords. Each communication apparatus could be arranged to transmit or receive any number of Gold codewords.

The transmitted signal has been described above as being a continuous cyclic signal. However, the signal could be an intermittent signal of varying length and varying Gold codewords. In intermittent signalling, the transmission of a Gold codeword is preceded by a period of inactivity where no transmission takes place. Intermittent signalling is more power efficient than continuous signalling and can yield significant power savings at the transmitter. For instance, one communication apparatus may send an alternating calibration signal to cause all of the other communication apparatuses to go into a calibration mode wherein the devices automatically adapt their operation to account for variations in the communication channel or the operating environment. For instance the threshold within the mark counter 28 and the space counter 29 may be adjusted in order to optimally detect the calibration signal.

Other modifications and applications of the present invention will be readily apparent to the appropriately skilled person, without departing from the scope of the appended claims.

The invention claimed is:

1. A communication apparatus for communicating over an electrical power cable, comprising:
    a transmitter circuit adapted to transmit a communication signal; and
    a receiver circuit adapted to receive a communication signal from another communication apparatus;

wherein the communication apparatus is adapted to transmit and receive communication signals over the power cable both when said power cable is conducting electricity and when said power cable is not conducting electricity;

wherein the communication signal comprises an amplitude shift keying signal; and wherein the receiver circuit further comprises:
an analog to digital converter adapted to sample the communication signal and output digital samples;
a filter adapted to filter the digital samples;
an amplitude tracker adapted to calculate the magnitude of each of a group of digital samples from the filter;
a mark counter adapted to count the number of digital samples within the group having magnitudes equal to or greater than a predetermined threshold;
a space counter adapted to count the number of digital samples within the group having magnitudes less than the predetermined threshold;
a comparator adapted to output an output signal indicative of whether or not the mark counter exceeds the space counter; and
a buffer adapted to store the output of the comparator.

2. The communication apparatus according to claim 1, wherein the electrical power cable is adapted to conduct mains electricity.

3. The communication apparatus according to claim 1, wherein the communication apparatus is adapted to be connectable to a device, the transmitter circuit being adapted to transmit the communication signal in response to an input control signal received from the device, and the receiver circuit being adapted to generate an output control signal indicative of whether a communication signal has been received and transmit the output control signal to the device.

4. The communication apparatus according to claim 3, wherein said device is a heat or smoke detector.

5. The communication apparatus according to claim 3, wherein said device is a carbon monoxide detector.

6. The communication apparatus according to claim 3, wherein said device is a security detector.

7. The communication apparatus according to claim 3, wherein the communication apparatus is adapted to be supplied with electrical power by a battery contained within said device or said communication apparatus.

8. The communication apparatus according to claim 1, wherein the amplitude shift keying signal comprises the presence or absence of a carrier signal at 108 kHz.

9. The communication apparatus according to claim 8, wherein the communication signal comprises a Gold codeword.

10. The communication apparatus according to claim 9, wherein the transmitter circuit is adapted to cyclically transmit the Gold codeword.

11. The communication apparatus according to claim 10, wherein the transmitter circuit is adapted to wait for a predetermined guard time period before each transmission of the Gold codeword.

12. The communication apparatus according to claim 11, wherein the communication apparatus is adapted to transmit and receive only one assigned Gold codeword.

13. The communication apparatus according to claim 11, wherein the communication apparatus is adapted to transmit and receive more than one assigned Gold codewords.

14. The communication apparatus according to claim 1, wherein the buffer is adapted to store the output of the comparator for each of a predetermined number of groups of digital samples.

15. The communication apparatus according to claim 14, wherein the receiver circuit is further adapted to determine the logical exclusive OR of the contents of the buffer and the or each assigned Gold code, and to generate an output control signal indicative of the result of said determination.

16. A method of communicating over an electrical power cable, the method comprising:
transmitting a communication signal; and
receiving a communication signal;
wherein said transmitting and receiving communication signals over said power cable takes place both when said power cable is conducting electricity and when said power cable is not conducting electricity;
wherein transmitting a communication signal further comprises transmitting an amplitude shift keying signal; and
wherein receiving a communication signal comprises:
sampling the communication signal to generate digital samples;
filtering the digital samples;
grouping a predetermined number of consecutive digital samples;
calculating the magnitude of each digital sample in the group;
comparing the magnitude of each digital sample in the group to a predetermined threshold;
incrementing either a mark counter or a space counter if the outcome of the said comparison is above or below the predetermined threshold respectively;
comparing the mark counter and the space counter at the end of the group; and
buffering the result of said comparison.

17. The method according to claim 16, wherein transmitting a communication signal comprises:
transmitting the communication system in response to an input control signal;
and wherein the method further comprises:
generating an output control signal indicative of whether a communication signal has been received.

18. The method according to claim 16, wherein transmitting a communication signal further comprises transmitting a Gold codeword.

19. The method according to claim 18, wherein transmitting a communication signal further comprises transmitting the Gold codeword cyclically.

20. The method according to claim 19, wherein transmitting a communication signal further comprises waiting for a predetermined guard time period before each transmission of the Gold codeword.

21. The method according to claim 16, wherein receiving a communication signal further comprises:
buffering the result of said comparison for each of a predetermined number of groups of digital samples.

22. The method according to claim 21, wherein receiving a communication signal further comprises:
computing the logical exclusive OR of the buffered results of said comparison for each of the predetermined number of groups of digital samples and at least one assigned Gold code; and
generating an output control signal indicative of the result of said computed logical exclusive OR.

23. A fire detection system comprising the communication apparatus of claim 1.

* * * * *